United States Patent
Pawlitzki

[11] 3,721,462
[45] March 20, 1973

[54] RAPID DISCONNECTION CLUTCH FOR NUCLEAR REACTOR CONTROL RODS

[75] Inventor: Rainer Pawlitzki, Erlangen, Germany

[73] Assignee: Siemens Aktiengesellschaft, Berlin, Germany

[22] Filed: June 9, 1970

[21] Appl. No.: 44,721

[30] Foreign Application Priority Data

June 19, 1969 Germany.....................P 19 31 108.1

[52] U.S. Cl. .......................287/119, 176/36, 294/83
[51] Int. Cl.................................................F16b 7/00
[58] Field of Search.........287/DIG. 5, 119; 294/83, 83 AA; 74/2; 85/5 B; 285/277; 176/36, 36 C; 75/22, 30

[56] References Cited

UNITED STATES PATENTS

| 2,259,257 | 10/1941 | MacBlane | 74/2 |
| 3,112,767 | 12/1963 | Cator | 285/277 X |
| 3,186,745 | 6/1965 | Lyles | 287/119 R |
| 2,948,383 | 8/1960 | Modrey | 24/211 R X |
| 3,337,257 | 8/1967 | Brynsrold | 294/83 X |

*Primary Examiner*—Andrew V. Kundrat
*Attorney*—Curt M. Avery, Arthur E. Wilfond, Herbert L. Lerner and Daniel J. Tick

[57] ABSTRACT

Stop balls removably couple a control rod linkage to a clutch piece. The clutch piece is movably mounted in a guide member. The guide member includes releasing means for releasing the stop balls and thereby decoupling the control rod linkage from the clutch piece when the clutch piece moves to a determined position.

1 Claim, 1 Drawing Figure

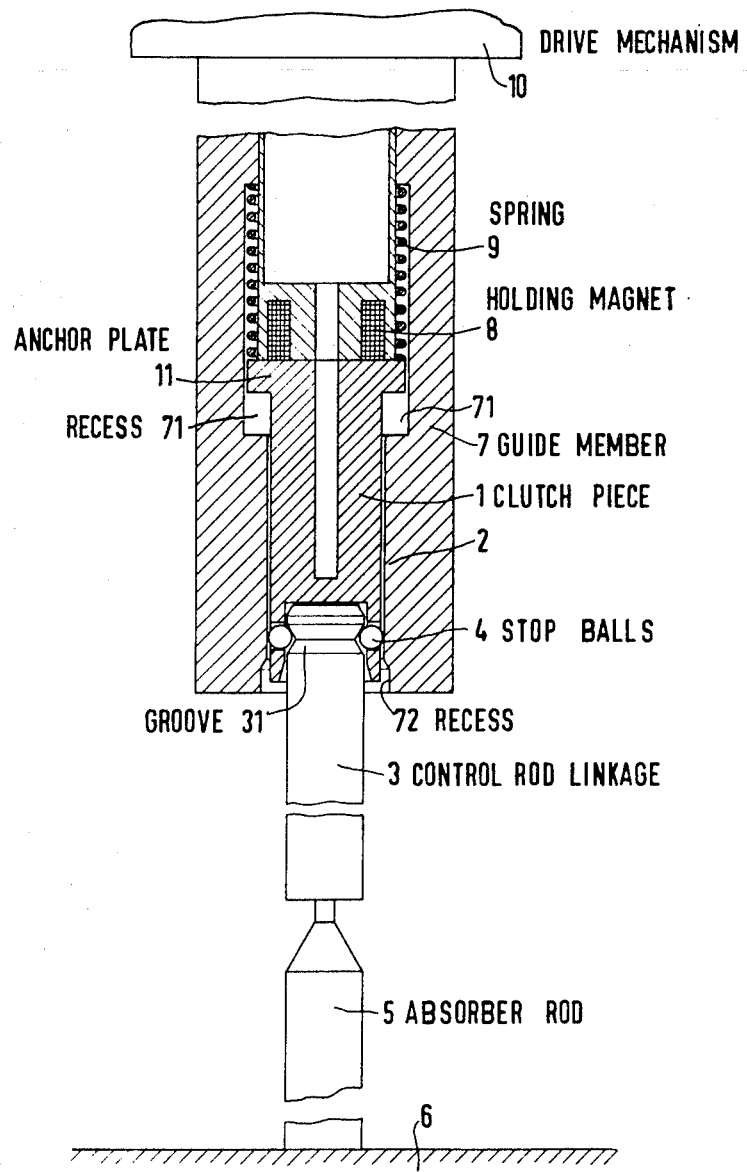

RAPID DISCONNECTION CLUTCH FOR NUCLEAR REACTOR CONTROL RODS

DESCRIPTION OF THE INVENTION

The invention relates to nuclear reactor control rods. More particularly, the invention relates to a rapid disconnection clutch for nuclear reactor control rods.

The rapid disconnection clutch of the invention couples a surge impulse transmitter and a control rod linkage hanging by an anchor plate.

During normal operation of a nuclear reactor, the control rods are moved back and forth in linear motion within the nuclear reactor. The control rods are moved by the control rod linkage and are coupled to a drive mechanism. In the event of a reactor disturbance, however, which cannot be corrected or stabilized by the normal motion of the control rods, rapid shut down of the nuclear reactor is necessary. In order to accomplish such a shut down, it has heretofore been customary to separate the control rods from their drive mechanism and to move the control rods into the nuclear reactor by gravity or by additionally accelerated surge impulse transmitters, thereby moving said control rods to a full inserted position. A surge impulse transmitter may comprise, for example, a prestressed spring or springs, or an electromagnetic device. The surge impulse transmitter is usually structurally connected to an electromagnetic holding device for the control rod linkage. The control rod linkage must be kept relatively light and thin, but is quite heavy due to the absorber rod which it supports and which hangs from it. It is therefore necessary to provide an anchor plate so that the magnetic coupling with the electromagnetic holding device has a larger surface area for attraction than the control rods.

Since an anchor plate cannot be dropped or moved to an inoperative position, a clutch must be provided between the anchor plate and the control rod linkage. Such a clutch usually has stop balls therein which are held in blocked positions by a movable sleeve. When the control rod linkage is moved to its inoperative position, the movable sleeve is moved vertically and permits the stop balls to become disengaged, so that the control rod linkage may be dropped or moved to its inoperative position. It is very difficult to impart an instantaneous acceleration to the control rod linkage at the instant of the command or signal for rapid movement of the control rod to its inoperative position. The problem of instantaneous release of the motion of the control rod and the control rod linkage at the instant of the command to move said control rod to its inoperative position and to disconnect the control rod linkage from the anchor plate has therefore arisen.

The principal object of the invention is to provide a new and improved rapid disconnection clutch for nuclear reactor control rods.

An object of the invention is to provide a rapid disconnection clutch for nuclear reactor control rods which decouples the control rod and disconnects the control rod linkage from the anchor plate at the instant of the decoupling command.

An object of the invention is to provide a rapid disconnection clutch for nuclear reactor control rods which is of simple structure, but efficient, effective and reliable in operation.

In accordance with the invention, a rapid disconnection clutch for nuclear reactor control rods comprises a guide member, a coupling member and a control rod linkage. A clutch piece is movably mounted in the guide member in operative proximity with the coupling member. Stop balls removably couple the control rod linkage to the clutch piece. The guide member includes releasing means for releasing the stop balls and thereby decoupling the control rod linkage from the clutch piece when the clutch piece moves to a determined position.

In accordance with the invention, a rapid disconnection clutch for nuclear reactor control rods couples a surge impulse transmitter and a control rod linkage hanging by an anchor plate. The clutch comprises a guide member having a bore formed therein. A surge impulse transmitter is provided in the bore in the guide member. A control rod linkage is provided. A clutch piece is movably mounted in the bore in the guide member in operative proximity with the impulse transmitter and has an anchor plate at its upper end. Clutch means at the lower end of the clutch piece and the upper end of the control rod linkage releasably couples the clutch piece to the control rod linkage. The clutch means comprises a groove formed in the control rod linkage at the upper end thereof and stop balls supported by the clutch piece at the lower end thereof. The bore of the guide member has a general diameter which is slightly greater than that of the clutch piece thereby maintaining the stop balls in the groove and thereby maintaining engagement between the clutch piece and the control rod linkage. The bore of the guide member has a diameter at its lower extremity which is greater than the general diameter and permits the stop balls to disengage from the groove and thereby provides disengagement between the clutch piece and the control rod linkage.

The bore of the guide member has a shoulder formed therein at an intermediate area which limits the downward movement of the clutch piece by engaging the anchor plate of the clutch piece. The clutch piece has a lower engaging surface and the control rod linkage has an upper engaging surface and the engaging surfaces are in abutment during engagement of the clutch means.

The surge impulse transmitter comprises spring means mounted in the bore of the guide member and abutting the anchor plate of the clutch piece. An electromagnet mounted in the bore of the guide member has a lower engaging surface. The clutch piece has an upper engaging surface in abutment with the lower engaging surface of the electromagnet. When the electromagnet is energized, the shoulder formed in the bore of the guide member retains the clutch piece within the area of control of the electromagnet.

The guide member is thus coupled at its upper area to the drive mechanism so that it participates only in the normal up and down motion of the control rod, and stops at the appropriate position.

In order that the invention may be readily carried into effect, it will now be described with reference to the accompanying drawing, wherein the single FIGURE is a schematic diagram, partly in section, of an embodiment of the rapid disconnection clutch of the invention.

A drive mechanism 10 moves the upper part of the control rod linkage up and down. The lower part of the control rod linkage comprises a guide member 7. The guide member 7 has an axial bore formed therein.

A surge impulse transmitter or spring 9 is mounted in the bore in the guide member 7. An electromagnet 8, which functions as a holding magnet, is mounted in the bore of the guide member 7. The holding magnet 8 has a lower engaging surface.

A clutch piece 1 is movably mounted, for movement in axial directions, in the bore in the guide member 7. The clutch piece 1 is in operative proximity with the impulse transmitter or spring 9. The clutch piece 1 has an anchor plate 11 having an upper engaging surface in abutment with the lower engaging surface of the electromagnet when the electromagnet is energized.

A clutch is provided at the lower end of the clutch piece 1 and the upper end of a control rod linkage 3 and functions to releasably couple the clutch piece to the control rod linkage. The clutch comprises a groove 31 formed in the control rod linkage 3 at the upper end thereof and stop balls 4 supported by the clutch piece 1 at the lower end thereof. The bore of the guide member 7 has a general diameter which is slightly greater than that of the clutch piece 1, so that the stop balls 4 are maintained in the groove 31 and thereby maintain engagement between said clutch piece and the control rod linkage 3. The guide member 7 has a diameter, forming a recess 72, at its lower extremity which is greater than the general diameter and permits the stop balls 4 to disengage from the groove 31 and thereby provides disengagement between the clutch piece 1 and the control rod linkage 3.

An absorber rod 5 is suspended from the control rod linkage 3. The bore of the guide member 7 is of even greater diameter than at its recess 72, in its upper area, thereby forming a recess 71 so that a shoulder is formed in said bore in an intermediate area. The shoulder limits the downward movement of the clutch piece 1 by engaging the anchor plate 11 thereof. This insures that the clutch piece 1 is retained within the area of control of the holding magnet 8. As long as the holding magnet 8 is energized, the spring 9 remains under compression. When the holding magnet 8 is deenergized, by disconnection of the current supplied thereto, the spring 9 expands downward and accelerates the downwardly moving clutch piece 1 and the control rod linkage 3. After the clutch piece 1 moves downward to a position at which the anchor plate 11 thereof abuts the shoulder of the guide member 7, said guide member is also moved downward. The stop balls 4 remain in their coupling positions during the period that the clutch piece moves downward in the guide member 7.

After a brief period of downward motion and at the time that the anchor plate 11 of the clutch piece 1 abuts the shoulder in the bore of the guide member 7, the stop balls 4 reach the recess 72 and are moved outward to their decoupling positions, so that the clutch piece 1 is then decoupled from the control rod linkage 3. The clutch piece 1 is then halted in its downward motion by the abutment of its anchor plate 11 with the shoulder formed in the recess 71 of the guide member 7. The kinetic energy of the control rod linkage 3 and the suspended absorber rod 5 moves the stop balls 4 out of the groove 31 and into the recess 72. If the stop balls 4 move relatively slowly into the recess 72, due to long disuse, there is no delay in time between the disengagement of the clutch and the beginning of the downward motion.

In order to remove the dropped absorber rod 5 from the nuclear reactor after the correction of the disturbance, the drive mechanism 10 moves the upper control rod linkage downward until the control rod linkage 3 seats at its upper end into the clutch piece 1, since said clutch piece is at its lowest position, at such time. At the same time, the clutch piece 1 is moved upward by the control rod linkage 3, relative to the guide member 7, which, as part of the upper control rod linkage, is moved downward. The clutch piece 1, relative to the guide member 7, is moved upward until the upper engaging surface of its anchor plate 11 abuts the holding magnet 8. As the clutch piece 1 is relatively moved upward, the chamfering of the recess 72 of said guide member directs the stop balls 4 back into the groove 31 of the control rod linkage 3, the clutch is then engaged or coupled.

After the energizing current is again supplied to the holding magnet 8, the absorber rod 5 may be moved upward by the drive mechanism 10.

The surge impulse transmitter may, of course, comprise any suitable device of the type described. The requirement is that the stored energy of the surge impulse transmitter be available for immediate use and that such energy be substantially exclusively utilized to accelerate downward movement of the control rod linkage 3 and the absorber rod 5 suspended therefrom.

The rapid disconnection clutch of the invention is not only of simple structure, but is extremely reliable in disengaging the clutch and in providing the greatest possible reduction in the time required for positioning the control rod linkage 3 in its inoperative position.

While the invention has been described by means of a specific example and in a specific embodiment, I do not wish to be limited thereto, for obvious modifications will occur to those skilled in the art without departing from the spirit and scope of the invention.

I claim:

1. A rapid disconnection clutch for nuclear reactor control rods coupling a surge impulse transmitter and a control rod linkage hanging by an anchor plate, said clutch comprising a guide member having a bore formed therein;

a surge impulse transmitter in the bore in said guide member;

a control rod linkage;

a clutch piece movably mounted in the bore in said guide member in operative proximity with said impulse transmitter and having an anchor plate at its upper end, the bore of said guide member having a shoulder formed therein at an intermediate area which limits the downward movement of said clutch piece by engaging the anchor plate of said clutch piece;

clutch means at the lower end of said clutch piece and the upper end of said control rod linkage for releasably coupling said clutch piece to said control rod linkage, said clutch means comprising a groove formed in said control rod linkage at the upper end thereof and stop balls supported by said clutch piece at the lower end thereof, the bore of said guide member having a general diameter which is slightly greater than that of said clutch piece thereby maintaining said stop balls in said groove and thereby maintaining engagement between said clutch piece and said control rod linkage and a diameter at its lower extremity which is greater than said general diameter and permits said stop balls to disengage from said groove and thereby provides disengagement between said clutch piece and said control rod linkage; and an electromagnet mounted in the bore of said guide member and having a lower engaging surface, said clutch piece having an upper engaging surface in abutment with the lower engaging surface of said electromagnet when said electromagnet is energized, the shoulder formed in the bore of said guide member retaining said clutch piece within the area of control of said electromagnet.

* * * * *